US009260068B2

United States Patent
Ohsumi et al.

(10) Patent No.: US 9,260,068 B2
(45) Date of Patent: Feb. 16, 2016

(54) IN-VEHICLE BATTERY SYSTEM (71) Applicant: Sanyo Electric Co., Ltd., Osaka (JP)

(72) Inventors: Nobuyuki Ohsumi, Hyogo (JP); Kaoru Nakajima, Hyogo (JP); Akinobu Tsunesada, Hyogo (JP); Hideki Sakata, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/435,444

(22) PCT Filed: Oct. 22, 2013

(86) PCT No.: PCT/JP2013/006234
§ 371 (c)(1),
(2) Date: Apr. 13, 2015

(87) PCT Pub. No.: WO2014/068896
PCT Pub. Date: May 8, 2014

(65) Prior Publication Data
US 2015/0232049 A1 Aug. 20, 2015

(30) Foreign Application Priority Data

Oct. 29, 2012 (JP) .................................. 2012-238298

(51) Int. Cl.
*B60R 16/04* (2006.01)
*B60K 11/06* (2006.01)
(Continued)

(52) U.S. Cl.
CPC ................ *B60R 16/04* (2013.01); *B60K 11/06* (2013.01); *B60R 16/033* (2013.01); *H01M 10/06* (2013.01); *H01M 16/00* (2013.01); *H01M 2220/20* (2013.01)

(58) Field of Classification Search
CPC .......... B60K 6/28; B60K 11/06; B60R 16/04; B60R 16/033; H01M 16/00; H01M 10/06; H01M 2220/20
See application file for complete search history.

(56) References Cited

U.S. PATENT DOCUMENTS 4,976,327 A * 12/1990 Abujudom et al. .......... 180/68.2
5,883,496 A * 3/1999 Esaki et al. .................... 320/132
(Continued)

FOREIGN PATENT DOCUMENTS

| JP | 2007-259530 | 10/2007 |
|----|-------------|---------|
| JP | 2010-208461 | 9/2010 |

(Continued)

OTHER PUBLICATIONS

International Search Report of PCT application No. PCT/JP2013/006234 dated Dec. 17, 2013.

*Primary Examiner* — Hau Phan
*Assistant Examiner* — Jacob Meyer
(74) *Attorney, Agent, or Firm* — Wenderoth, Lind & Ponack, L.L.P.

(57) ABSTRACT

An in-vehicle battery system comprises a first power storage module including a lead-acid battery, and a second power storage module including a power storage portion having a higher energy density than that of the lead-acid battery. The lead-acid battery and the power storage portion are electrically connected in parallel to a power generating portion which converts a regenerative energy to electric power. The first power storage module and the second power storage module are provided in an engine room of a vehicle. The second power storage module is disposed more distantly than the first power storage module from an engine.

7 Claims, 5 Drawing Sheets

(51) Int. Cl.
    *B60R 16/033*    (2006.01)
    *H01M 16/00*    (2006.01)
    *H01M 10/06*    (2006.01)

(56)            References Cited

U.S. PATENT DOCUMENTS

| | | | | |
|---|---|---|---|---|
| 6,507,506 | B1* | 1/2003 | Pinas et al. | 363/79 |
| 6,615,438 | B1* | 9/2003 | Franco et al. | 15/250.02 |
| 6,892,417 | B2* | 5/2005 | Franco et al. | 15/250.02 |
| 7,108,754 | B2* | 9/2006 | Franco et al. | 134/34 |
| 7,171,716 | B2* | 2/2007 | Franco et al. | 15/250.05 |
| 7,445,165 | B2* | 11/2008 | Franco et al. | 239/284.1 |
| 7,728,546 | B2* | 6/2010 | Tanaka et al. | 320/104 |
| 7,775,224 | B2* | 8/2010 | Franco et al. | 134/198 |
| 7,839,116 | B2* | 11/2010 | Esaka et al. | 320/103 |
| 8,360,185 | B2* | 1/2013 | Ogata | 180/65.51 |
| 8,364,388 | B2* | 1/2013 | Naito et al. | 701/439 |
| 8,703,311 | B2* | 4/2014 | Sawaguchi et al. | 429/62 |
| 2003/0047366 | A1* | 3/2003 | Andrew et al. | 180/68.5 |
| 2004/0053083 | A1* | 3/2004 | Kobayashi et al. | 429/9 |
| 2004/0201365 | A1* | 10/2004 | Dasgupta et al. | 320/116 |
| 2005/0036771 | A1* | 2/2005 | Bauck et al. | 392/465 |
| 2005/0177969 | A1* | 8/2005 | Franco et al. | 15/250.01 |
| 2005/0284503 | A1* | 12/2005 | Franco et al. | 134/18 |
| 2006/0220405 | A1* | 10/2006 | Ohe et al. | 296/37.1 |
| 2007/0094832 | A1* | 5/2007 | Franco et al. | 15/250.05 |
| 2007/0219670 | A1* | 9/2007 | Tanaka et al. | 700/295 |
| 2008/0111508 | A1* | 5/2008 | Dasgupta et al. | 318/139 |
| 2009/0014035 | A1* | 1/2009 | Franco et al. | 134/19 |
| 2009/0015193 | A1* | 1/2009 | Esaka et al. | 320/103 |
| 2009/0032316 | A1* | 2/2009 | Chakrabarti et al. | 180/65.1 |
| 2009/0145592 | A1* | 6/2009 | Leitch et al. | 165/185 |
| 2010/0089547 | A1* | 4/2010 | King et al. | 165/42 |
| 2010/0106401 | A1* | 4/2010 | Naito et al. | 701/201 |
| 2010/0307845 | A1* | 12/2010 | Ogata | 180/65.22 |
| 2012/0169129 | A1* | 7/2012 | Kim et al. | 307/80 |
| 2012/0261397 | A1* | 10/2012 | Schwarz et al. | 219/202 |
| 2012/0268058 | A1* | 10/2012 | Enoki | 320/104 |
| 2012/0296506 | A1* | 11/2012 | Kotani et al. | 701/22 |
| 2013/0066492 | A1* | 3/2013 | Holmes et al. | 701/22 |
| 2013/0187590 | A1* | 7/2013 | Ferrel et al. | 320/104 |
| 2014/0077771 | A1* | 3/2014 | Yamashita et al. | 320/167 |
| 2014/0151138 | A1* | 6/2014 | Kitami et al. | 180/65.21 |
| 2014/0184153 | A1* | 7/2014 | Saint-Leger et al. | 320/108 |
| 2014/0225559 | A1* | 8/2014 | Sugano | 320/108 |
| 2014/0253033 | A1* | 9/2014 | Stancil et al. | 320/109 |
| 2014/0312687 | A1* | 10/2014 | Gu et al. | 307/10.1 |
| 2015/0118537 | A1* | 4/2015 | Obasih et al. | 429/120 |
| 2015/0188188 | A1* | 7/2015 | Zhang et al. | |
| 2015/0188207 | A1* | 7/2015 | Son et al. | |
| 2015/0202983 | A1* | 7/2015 | Le et al. | |
| 2015/0202985 | A1* | 7/2015 | Le et al. | |
| 2015/0293180 | A1* | 10/2015 | Dulle | |

FOREIGN PATENT DOCUMENTS

| | | |
|---|---|---|
| JP | 2011-176958 | 9/2011 |
| JP | 2012-152087 | 8/2012 |

* cited by examiner

IN-VEHICLE BATTERY SYSTEM

TECHNICAL FIELD

The present invention is related to an in-vehicle battery system.

BACKGROUND ART

Generally, in a vehicle having an internal-combustion engine as a driving source, a lead-acid battery which supplies power to various electric loads of a starter motor or the like, is installed. The lead-acid battery is inexpensive, compared with a high performance storage battery having a high output and a high energy density of a nickel hydride storage battery, a lithium ion storage battery, or the like. However, the lead-acid battery is low in a durability of frequent charging and discharging. Especially, in the vehicles having the idle stop function (the idle reduction function), as the lead-acid battery is frequently discharged, it is considered that the lead-acid battery is early degraded. Further, in the case that the lead-acid battery is charged by a power generation of an alternator from a regenerative energy of the vehicle, as the lead-acid battery is frequently charged, it is considered that the lead-acid battery is earlier degraded. Against this, only replacing the lead-acid battery with the high performance storage battery largely increases costs.

In contrast, a vehicle battery device including a generator of an alternator or the like, a lead-acid battery which is charged with power generated the generator, and a second storage battery which is electrically connected in parallel to the lead-acid battery and is charged with power generated the generator and has a high output or energy density compared with the lead-acid battery, have been known (refer to patent literature 1). In this way, by having the second storage battery of a high performance in addition to the lead-acid battery, a degradation of the lead-acid battery is suppressed, and in addition it is inexpensive. Namely, for example, the high performance storage battery preferentially caries out power supply to the electric loads during the idle stop and a regenerative charging, and then the degradation of the lead-acid battery can be decreased. On the other hand, the inexpensive lead-acid battery preferentially carries out power supply for a long time at the time of parking the vehicle or the like, and then the high performance storage battery can be made a low capacity, and costs can be suppressed.

CITATION LIST

Patent Literature

Patent Literature 1: Japanese Laid-Open Patent Publication No. 2011-176958

SUMMARY OF THE INVENTION

As the result of research and development by inventors of the present invention, in a conventional in-vehicle battery system having the lead storage batter and a power storage portion as an auxiliary power source, it is found that charge/discharge efficiency of the power storage portion can be improved.

The present disclosure is developed for the purpose of such needs. One non-limiting and explanatory embodiment provides a technology which improves a charge/discharge efficiency of a power storage portion in an in-vehicle battery system.

An in-vehicle battery system of the present disclosure comprises a first power storage module including a lead-acid battery, and a second power storage module including a power storage portion having a higher energy density than that of the lead-acid battery. The lead-acid battery and the power storage portion are electrically connected in parallel to a power generating portion which converts a regenerative energy to electric power. The first power storage module and the second power storage module are provided in an engine room of a vehicle. The second power storage module is disposed more distantly than the first power storage module from an engine.

An in-vehicle battery system of the present disclosure comprises a first power storage module including a lead-acid battery, and a second power storage module including a power storage portion having a higher energy density than that of the lead-acid battery. The lead-acid battery and the power storage portion are electrically connected in parallel to a power generating portion which converts a regenerative energy to electric power. The second power storage module is thermally connected to a window cleaning liquid tank in an engine room of a vehicle.

An in-vehicle battery system of the present disclosure comprises a first power storage module including a lead-acid battery, and a second power storage module including a power storage portion having a higher energy density than that of the lead-acid battery. The lead-acid battery and the power storage portion are electrically connected in parallel to a power generating portion which converts a regenerative energy to electric power. The first power storage module and the second power storage module are provided in an engine room of a vehicle. The in-vehicle battery system further comprises a guide member which guides an outer air which flows into the engine room from outside of the vehicle to the second power storage module.

An in-vehicle battery system of the present disclosure comprises a first power storage module including a lead-acid battery, and a second power storage module including a power storage portion having a higher energy density than that of the lead-acid battery. The lead-acid battery and the power storage portion are electrically connected in parallel to a power generating portion which converts a regenerative energy to electric power. The second power storage module is thermally connected to a vehicle structure.

A technology which improves a charge/discharge efficiency of a power storage portion in an in-vehicle battery system, can be provided.

DETAILED DESCRIPTION OF THE INVENTION

Hereinafter, embodiments of the present invention is explained, referring to figures. Here, in all of the figures, the same reference numbers represent the same configuration elements, and detailed descriptions are appropriately omitted.

Embodiment 1

First of all, before this embodiment is concretely explained, a fundamental configuration is explained. The inventors find that in an in-vehicle battery system having a lead-acid battery and a power storage portion of a high performance, the power storage portion and the lead-acid battery are disposed in an engine room of a vehicle. By disposing the power storage portion in the engine room, the lead-acid battery and the power storage portion are disposed near to each other, and by this an influence of a wiring resistance can be decreased. As the result, charge/discharge efficiency of the power storage portion can be improved. Further, it also suppresses that, for example, space within the passenger compartment is decreased, and wirings of connections between an alternator as a generator and the lead-acid battery become complicated in the case that the power storage portion is disposed in a cabin (a passenger compartment) of the vehicle. However, an engine of a high temperature heat source is disposed in the engine room. Therefore, the temperature within the engine room is comparatively high, and when the power storage portion is disposed within the engine room, a temperature of the power storage portion is increased, and then a life of the power storage portion may be remarkably decreased by charging and discharging at the high temperature. The applicant develops the in-vehicle battery system of the embodiment based on the above findings.

Figure 1:
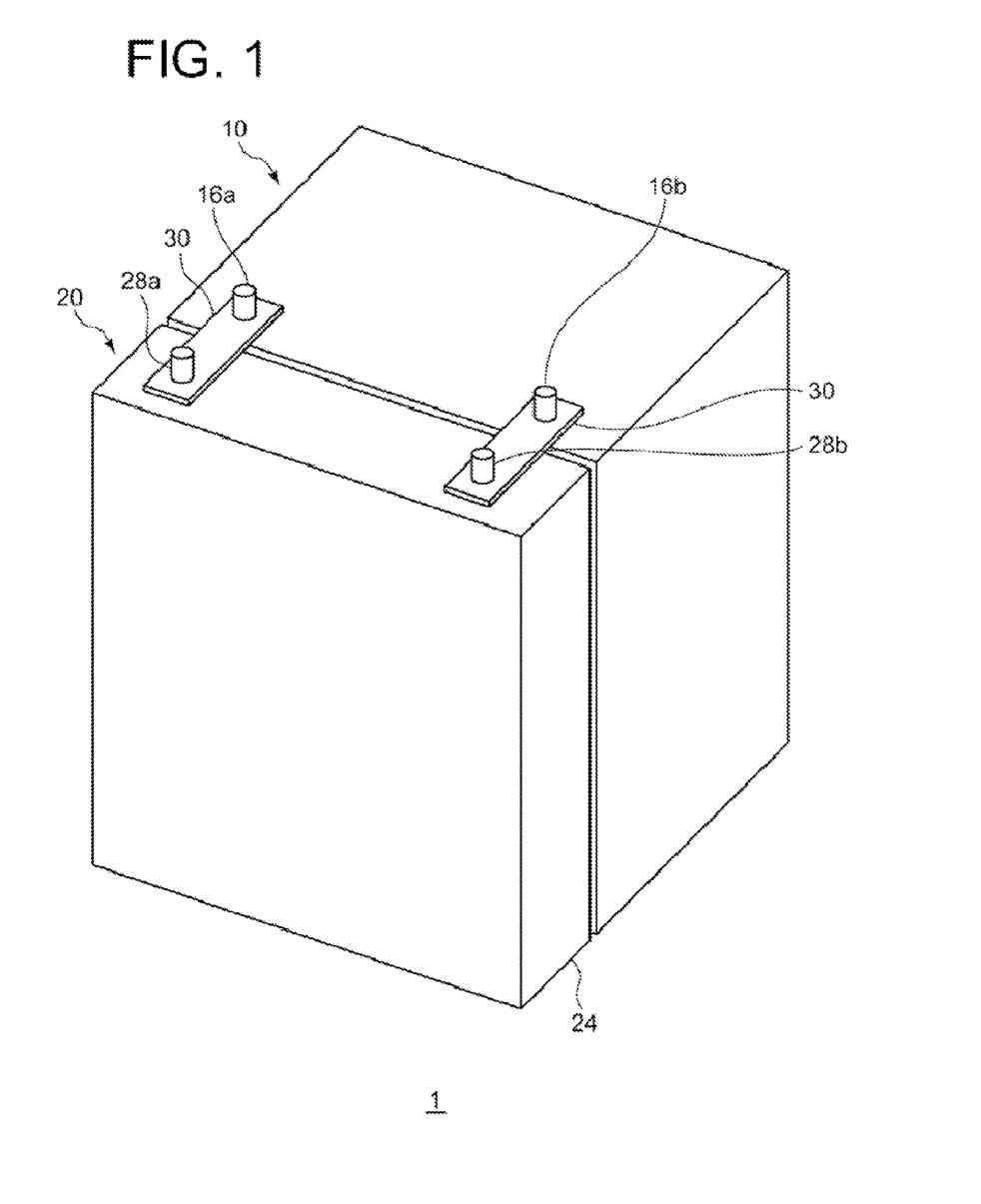
FIG. 1 is a schematic perspective view showing an in-vehicle battery system of the embodiment 1.
Figure 2:
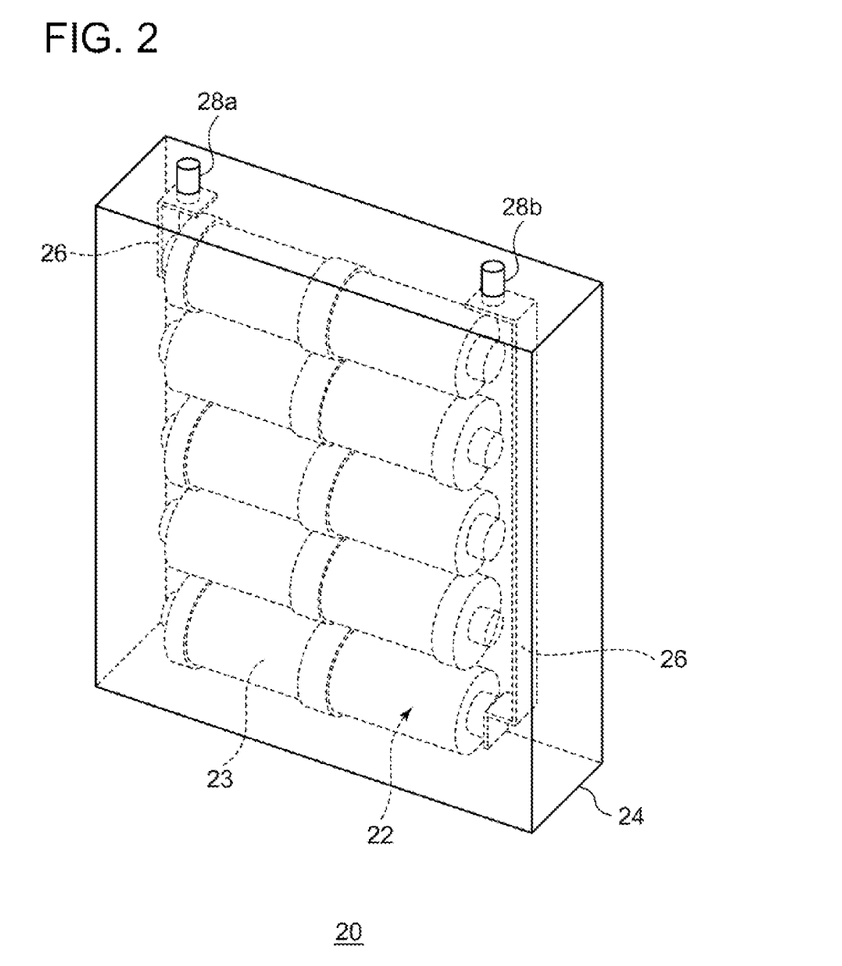
FIG. 2 is a schematic perspective view showing a second power storage module.
Figure 3:
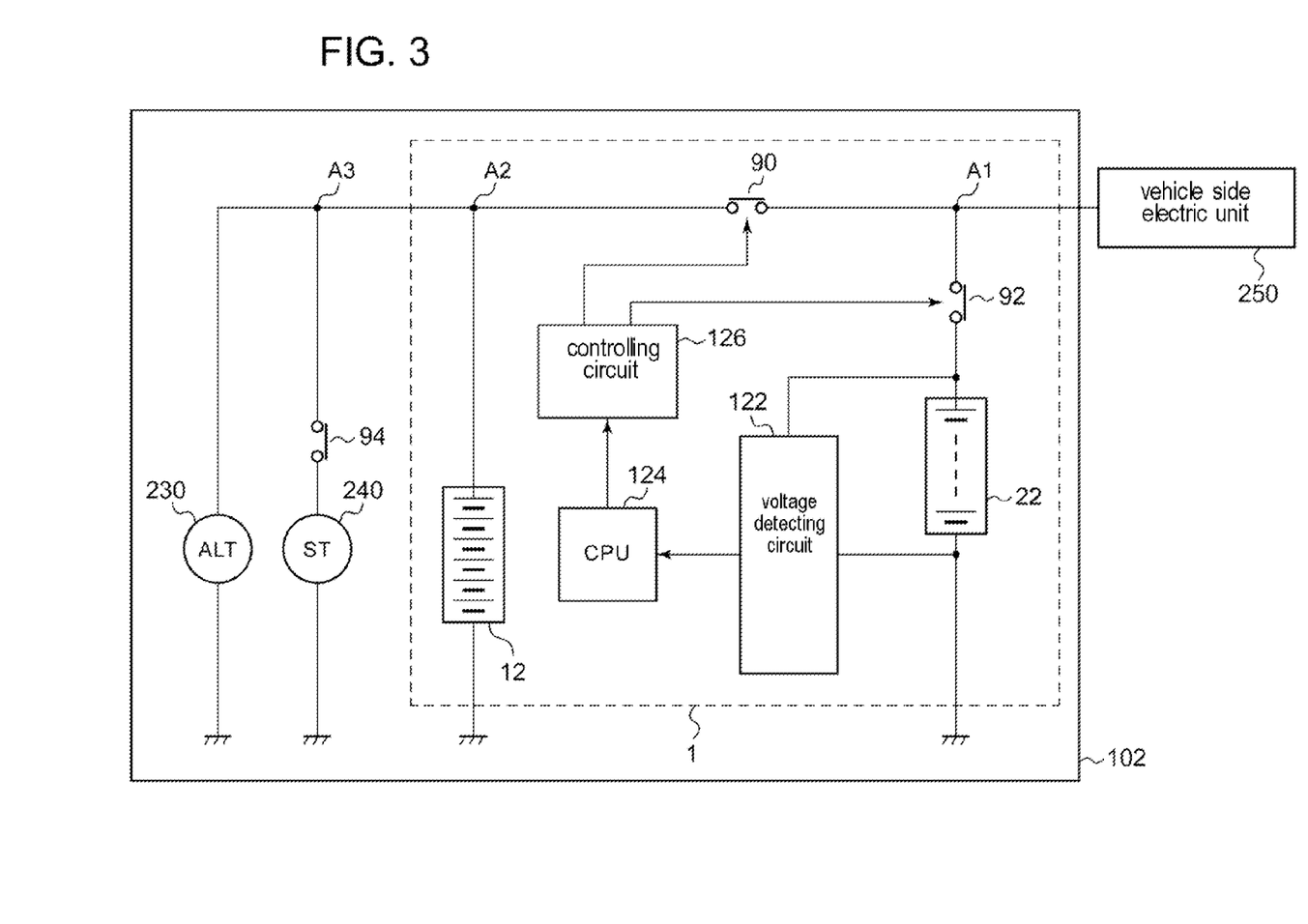
FIG. 3 is an electric block diagram including the in-vehicle battery system of the embodiment 1.

FIG. 1 is a schematic perspective view showing an in-vehicle battery system of the embodiment 1. FIG. 2 is a schematic perspective view showing a second power storage module. FIG. 3 is an electric block diagram including the in-vehicle battery system of the embodiment 1. Here, in FIG. 2, a part of the wirings is omitted, and an inner structure of the second power storage module is shown in a dashed line.

The in-vehicle battery system of the embodiment 1 is a battery system installed in a vehicle having an internal-combustion engine as a driving source. Preferably, the vehicle has the idle stop function (idle reduction function) in which the internal-combustion engine is automatically stopped at the time of vehicle stopping, and the internal-combustion engine is restarted at the time of performing starting operation of releasing a brake pedal or the like.

As shown in FIG. 1 and FIG. 2, an in-vehicle battery system 1 of the embodiment 1 has a first power storage module 10, and a second power storage module 20. The first power storage module 10 includes a lead-acid battery 12 (refer to FIG. 3), and a first case 14 which stores the lead-acid battery 12. The lead-acid battery 12 is a prior art lead-acid battery in which well-known cells of the lead-acid battery is stored in a case, and its structure is not limited to a specific one. Concretely, in single cells which constitute the lead-acid battery 12, lead is used as a negative electrode active material, and lead oxide is used as a positive electrode active material, and sulfuric acid is used as an electrolyte. The lead-acid battery 12 is configured to electrically connect a plurality of single cells in series. Further, the first storage battery module 10 has a negative terminal 16a and a positive terminal 16b exposed on the upper surface of the first case 14. Hereinafter, the negative terminal 16a and the positive terminal 16b are appropriately described as external terminals 16.

The second power storage module 20 includes a power storage portion 22 which has a higher energy density (Wh/kg) than that of the lead-acid battery 12, and a second case 24 which stores the power storage portion 22.

The power storage portion 22 is configured, for example, by a lithium ion storage batter, a nickel hydride battery, or the like. For example, when the storage battery configuring the power storage portion 22 is the lithium ion storage battery, the storage battery has a well-known cell structure of the lithium ion storage battery, and it is not limited to a specific one. For example, in single cells which constitute the lithium ion storage battery, lithium metal oxide of lithium cobalt oxide or the like as a positive electrode active material, and carbon material of carbon or the like as a negative electrode active material, an organic electrolyte of ethylene carbonate, propylene carbonate, or the like as an electrolyte are used. The lithium ion storage battery is configured to electrically connect a plurality of single cells in series. The power storage portion 22 of the embodiment is configured by 10 pieces of cylindrical storage batteries 23. Here, the number, the shape, or the disposition of the storage batteries 23 is not limited to a specific one. For example, the shape of the storage battery 23 may be prismatic. Here, the storage battery constituting the power storage portion 22 of the embodiment can be the nickel hydride battery other than the lithium ion battery. The nickel hydride battery has a high degradation durability at a high temperature compared with the lithium ion battery. Therefore, when the power storage portion 22 is configured by the nickel hydride battery, decrease of the life in the power storage portion 22 can be further suppressed.

Each of the storage batteries 23 is connected to each other in series by electric wiring 26, and is stored in the second case 24. One part of the wiring 26 is exposed on the upper surface of the first case 14, and then a negative terminal 28a is formed. One part of the wiring 26 is exposed on the upper surface of the first case 14, and then a negative terminal 28a is formed. One part of the wiring 26 is exposed on the upper surface of the first case 14, and then a positive terminal 28b is formed. Hereinafter, the negative terminal 28a and the positive terminal 28b are appropriately described as external terminals 28. One end of a connecting member 30 is connected to the external terminals 28 of the second power storage module 20. The other end of the connecting member 30 is connected to the external terminal 16 of the first power storage module 10. From this, the first power storage module 10 and the second power storage module 20 are coupled to each other. Here, the connecting member 30 has an insulation property. Therefore, the external terminals 28 of the second power storage module 20 and the external terminals 16 of the first power storage module 10 are coupled by the connecting member 30 in an insulated state from each other.

In the embodiment, each of the first power storage module 10 and the second power storage module 20 has a rectangular box shape, and these are coupled such that main surfaces of these are disposed in parallel to each other. The first power storage module 10 and the second power storage module 20 may be disposed such that the main surfaces of these contact each other. Here, coupling method of the first power storage module 10 and the second power storage module 20 is not limited to a specific one.

As shown in FIG. 3, the lead-acid battery 12 and the power storage portion 22 of the in-vehicle battery system 1 are electrically connected in parallel to an alternator 230 (power generation portion), a starter motor 240, and a vehicle side electric unit 250. Besides these, the in-vehicle battery system 1 has a voltage detecting circuit 122, a CPU 124, and a controlling circuit 126. The voltage detecting circuit 122 detects a voltage of the power storage portion 22. The CPU 124 directs the controlling circuit 126 to carry out the ON/OFF control of switches (switches 90, 92) based on the voltage detected by the voltage detecting circuit 122 or vehicle driving states. The controlling circuit 126 carries out the ON/OFF control of the switches. For example, the voltage detecting circuit 122, the CPU 124, and the controlling circuit 126 are incorporated in the second power storage module 20.

The switch 90 is connected between a branch point A1 among the power storage portion 22 and the vehicle side electric unit 250 and a branch point A2 among the lead-acid battery 12 and the alternator 230. By the ON/OFF state of the switch 90, a current flow between the power storage portion 22 and the alternator 230 is made or stopped. The switch 92 is connected between the branch point A1 and the power storage portion 22. By the ON/OFF state of the switch 92, a current flow between the power storage portion 22, and the switch 90 and the vehicle side electric unit 250 is made or stopped.

The alternator 230 converts a rotation energy of an crank shaft to electric power. The starter motor 240 is a motor which rotates the crank shaft at the time of starting the internal-combustion engine. The starter motor 240 is connected at a branch point A3 between the branch point A2 and the alternator 230. A switch 94 is connected between the branch point A3 and the starter motor 240. By the ON/OFF state of the switch 94, a current flow to the starter motor 240 is made or stopped. An ECU which is not shown in the figures carries out the ON/OFF control of the switch 94.

The vehicle side electric unit 250 includes general electric loads. Some electric load like a car navigation system or an audio requires a stable voltage of the power supply. It also includes a headlight, windshield wipers, or a supply fan for an air conditioner.

During a Regenerative Charging

When the lead-acid battery 12 and the power storage portion 22 are charged with a regenerative energy by a regenerative braking of the vehicle, the switch 90 is the ON state. While the regenerative energy is generated, the lead-acid battery 12 is charged, and is kept at a state near a full charge. On the other hand, when the voltage of the power storage portion 22 detected by the voltage detecting circuit 122 is less than a predetermined minimum voltage, the switch 92 is the ON state, and the power storage portion 22 is charged during the ON state of the switch 92. Here, during charging by the regenerative energy, the switch 94 is turned off, and then the starter motor 240 is separated from the charging and discharging circuit.

Time of Normal Discharging

At the time of the engine driving except for charging with the regenerative energy as mentioned above, both of the switch 90 and the switch 94 are the OFF state. On the other hand, when the voltage of the power storage portion 22 detected by the voltage detecting circuit 122 is the predetermined minimum voltage or more, the switch 92 is the ON state, and electric power of the power storage portion 22 is supplied to the vehicle side electric unit 150.

Time of Idle Stop and Time of Operation of Starter Motor

When the engine is automatically stopped at the idle stop and the starter motor operates at starting the engine, the switch 94 is turned on, and the switch 90 is turned off. Further, the switch 92 is turned on. By this, the power storage portion 22 and the vehicle side electric unit 250 are separated from the alternator 230 and the starter motor 240, and then it prevents discharging from the power storage portion 22 to the starter motor 240. In this state, when the voltage of the power storage portion 22 detected by the voltage detecting circuit 122 is the predetermined minimum voltage or more, the switch 92 is turned on, and then electric power of the power storage portion 22 is supplied to the vehicle side electric unit 250.

Figure 4:
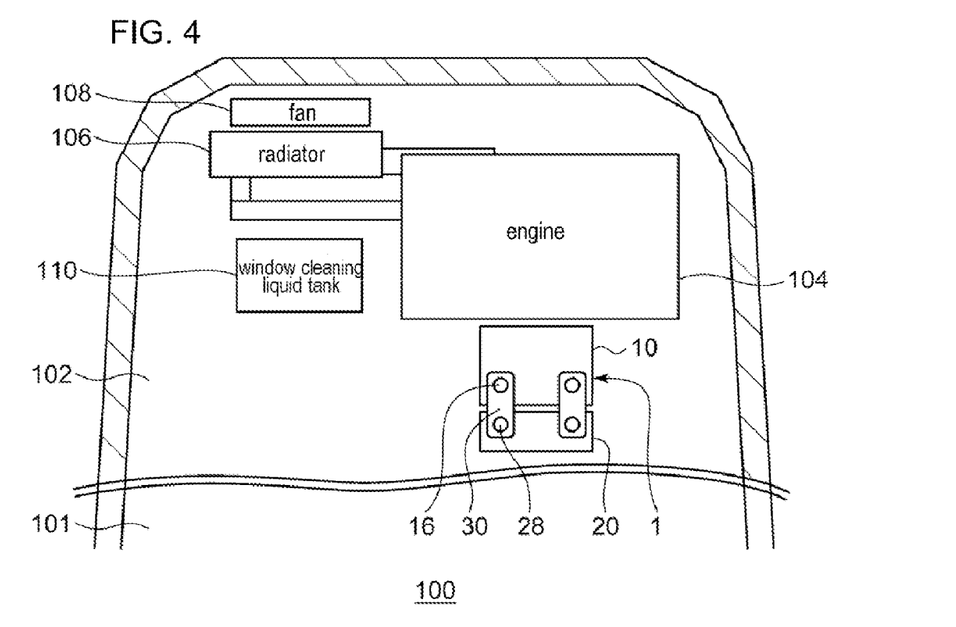
FIG. 4 is a schematic view showing a setting structure in the in-vehicle battery system of the embodiment 1.

Next, a setting structure of the in-vehicle battery system of the embodiment is explained. FIG. 4 is a schematic view showing the setting structure in the in-vehicle battery system of the embodiment 1. FIG. 4 shows the inner structure in the engine room 102 of the vehicle 100 in a plan view. In the vehicle 100, the engine room 102 is provided at the vehicle front side of the passenger compartment 101.

In the engine room 102 of the vehicle 100, the in-vehicle battery system 1, the engine 104 (internal-combustion engine), a radiator 106, a fan 108, a window cleaning liquid tank 110, or the like is stored. The engine 104, the radiator 106, the fan 108, and the window cleaning liquid tank 110 are well-known.

The first power storage module 10 and the second power storage module 20 are set side by side in the engine room 102 of the vehicle 100. The second power storage module 20 is disposed more distantly than the first power storage module 10 from the engine 104. Thus, the second power storage module 20 is set in spaced relationship with the engine 104 as the thermal source, and then this structure can suppress heat transfer from the engine 104 to the second power storage module 20. As the result, the temperature increase of the power storage portion 22 installed in the second power storage module 20 can be suppressed.

In the embodiment, the engine 104 and the second storage module 20 sandwich the first power storage module 10. Namely, the first power storage module 10 is disposed and sandwiched between the engine 104 and the second storage module 20. The first power storage module 10 has a considerably large heat capacity, and then this structure at least partially stops heat transfer from the engine 104 to the second power storage module 20, and surely suppresses the temperature increase of the power storage module 22. Further, since heat generated by charging and discharging of the power storage portion 22 can be transferred to the first power storage module 10, the temperature increase of the power storage portion 22 can be surely suppressed.

In addition, the second power storage module 20 is disposed nearer than the first power storage module 10 to the passenger compartment 101. In the vehicle 100, as the engine room 102 is disposed in front of the passenger compartment 101, the second power storage module 20 is disposed at the vehicle rear side behind the first power storage module 10. In this way, the second power storage module 20 is disposed farther within the vehicle than the first power storage module 10, and the first power module 10 is disposed farther from a center of the vehicle than the second power storage module 20. Therefore, at the case of a crash of the vehicle 100 against other vehicle or an obstacle, it can decrease a possibility that the second power storage module 20 is damaged. As the result, a safety of the in-vehicle battery system 1 can be enhanced, and then a safety of the vehicle can be also enhanced.

As explained above, in the vehicle battery system 1 of the embodiment, the first power storage module 10 and the second power storage module 20 are provided in the engine room 102 of the vehicle 100. The second power storage module 20 is disposed more distantly than the first power storage module 10 from the engine 104. Thus, the second power storage module 20 is set in spaced relationship with the engine 104 as the thermal source. Therefore, the temperature increase of the power storage portion 22 installed in the engine room of a high temperature can be suppressed, and then decrease of the life in the power storage portion 22 by charging and discharging in a high temperature state can be suppressed. Further, the first power storage module 10 and the second power storage module 20 are provided in the engine room 102 of the vehicle 100, and then charge/discharge efficiency of the power storage portion 22 can be improved, and then charging and discharging performance can be stabilized.

Embodiment 2

Figure 5:
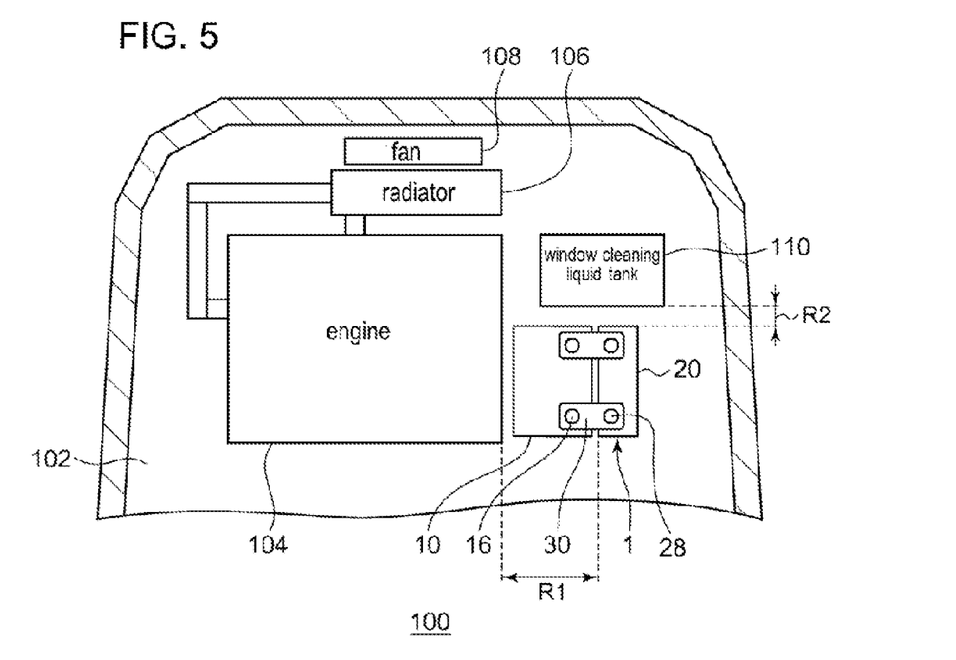
FIG. 5 is a schematic view showing a setting structure in the in-vehicle battery system of the embodiment 2.

An in-vehicle battery system of an embodiment 2 is in common with the configuration of the in-vehicle battery system of the embodiment 1 except for a setting structure of the in-vehicle battery system. The in-vehicle battery system of the embodiment 2 is mainly explained below about configuration elements different from the embodiment 1. FIG. 5 is a schematic view showing the setting structure in the in-vehicle battery system of the embodiment 2. FIG. 5 shows the inner structure in the engine room 102 of the vehicle 100 in a plan view.

In the in-vehicle battery system 1 of the embodiment, the first power storage module 10 and the second power storage module 20 are set side by side in the engine room 102 of the vehicle 100. Then, the second power storage module 20 is disposed in the vicinity of the window cleaning liquid tank 110 in the engine room 102 of the vehicle 100, and is thermally connected to the window cleaning liquid tank 110. As the window cleaning liquid tank 110 stores a window cleaning liquid, it has a considerably large heat capacity. Therefore, heat generated at the power storage portion 22 is transferred to the window cleaning liquid tank 110 having the considerably large heat capacity, and the power storage portion 22 can be cooled.

Thus, the window cleaning liquid tank 110 is used for cooling the power storage portion 22, it suppresses a temperature increase of the power storage portion 22. As the result, decreases of the life and the charging and discharging performance in the power storage portion 22 by charging and discharging in a high temperature state can be suppressed, and then charging and discharging performance can be stabilized.

Further, in this embodiment, the second power storage module 20 is disposed at the position where the distance R2 between the second power storage module 20 and the window cleaning liquid tank 110 is smaller than the distance R1 between the second power storage module 20 and the engine 104. Namely, the power storage portion 22 is in spaced relationship with the engine 104 as the heat source, and is in the vicinity of the window cleaning liquid tank 110 having the large heat capacity. By this, a cooling efficiency of the power storage portion 22 can be improved. Here, it is preferable that the second power storage module 20 contacts the window cleaning liquid tank 110. By the second power storage module 20 contacting the window cleaning liquid tank 110, heat generated at the power storage portion 22 can be surely transferred to the window cleaning liquid tank 110.

Embodiment 3

Figure 6:
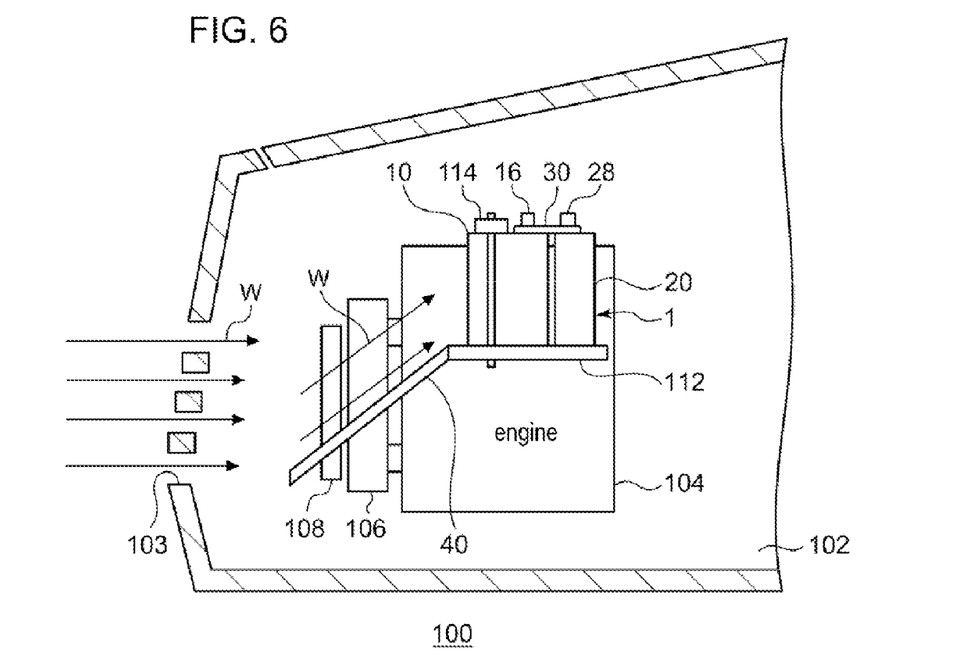
FIG. 6 is a schematic view showing a setting structure of the in-vehicle battery system of the embodiment 3.

An in-vehicle battery system of an embodiment 3 is in common with the configuration of the in-vehicle battery system of the embodiment 1 except for a setting structure of the in-vehicle battery system. The in-vehicle battery system of the embodiment 3 is mainly explained below about configuration elements different from the embodiment 1. FIG. 6 is a schematic view showing the setting structure in the in-vehicle battery system of the embodiment 3. FIG. 6 shows the inner structure in the engine room 102 of the vehicle 100 in a side view.

In the in-vehicle battery system 1 of the embodiment, the first power storage module 10 and the second power storage module 20 are set side by side in the engine room 102 of the vehicle 100. The first power storage module 10 and the second power storage module 20 are mounted on a mounting tray 112, and are fixed by a fixing member 114 to the mounting tray 112.

Further, the in-vehicle battery system 1 has a guide member 40 which guides an outer air which flows into the engine room 102 from outside of the vehicle to the second power storage module 20. For example, the guide member 40 is a flow-straightening plate made of a metal plate or the like. During driving of the vehicle 100, the air W flows into the engine room 102 through an opening portion 103 of a radiator grille or the like, progresses along the guide member 40 in the engine room 102, and are blown to the second power storage module 20. Here, the guide member 40 may guide an air which flows under the chassis to the second power storage module 20.

Since the outer air is blown to the second power storage module 20 in this way, a cooling efficiency of the power storage portion 22 can be enhanced. Then, a temperature increase can be suppressed. As the result, a decrease in charge/discharge efficiency of the power storage portion 22 can be suppressed, and then charging and discharging performance can be stabilized. Here, the guide member 40 may guide the outer air to the first power storage module 10 in addition to the second power storage module 20. By this, also a cooling efficiency of the first power storage module 10 can be enhanced, and heat generated at the power storage portion 22 is transferred to the first power storage module 10, and in the configuration of cooling the power storage portion 22 a temperature increase of the power storage portion 22 can be more suppressed Embodiment 4

Figure 7:
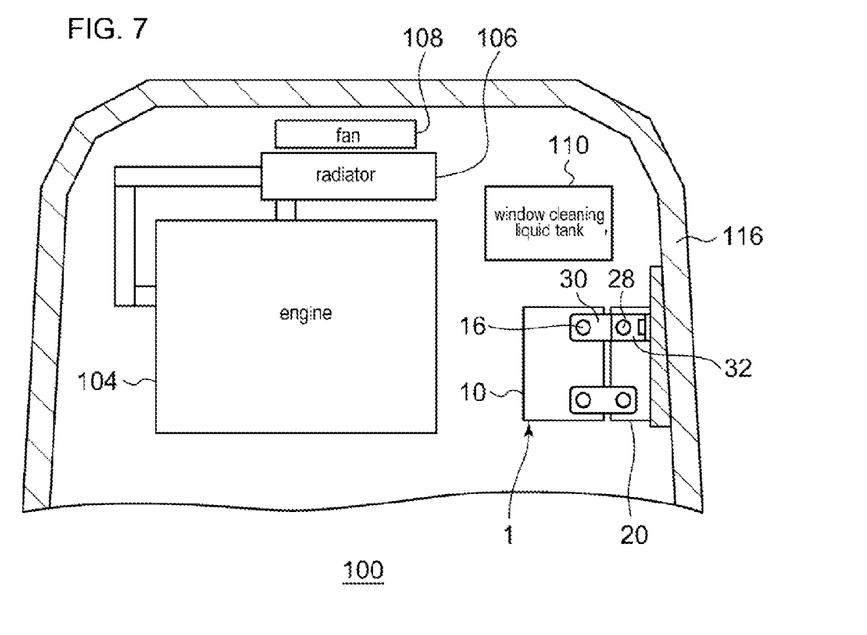
FIG. 7 is a schematic view showing a setting structure in the in-vehicle battery system of the embodiment 4.

An in-vehicle battery system of an embodiment 4 is in common with the configuration of the in-vehicle battery system of the embodiment 1 except for a setting structure of the in-vehicle battery system. The in-vehicle battery system of the embodiment 4 is mainly explained below about configuration elements different from the embodiment 1. FIG. 7 is a schematic view showing the setting structure in the in-vehicle battery system of the embodiment 4. FIG. 7 shows the inner structure in the engine room 102 of the vehicle 100 in a plan view.

In the in-vehicle battery system 1 of the embodiment, the first power storage module 10 and the second power storage module 20 are set side by side in the engine room 102 of the vehicle 100. Then, the second power storage module 20 is thermally connected to a vehicle structure 116 including the body and the chassis. The second power storage module 20 of this embodiment is disposed so as to directly contact the vehicle structure 116, and then is thermally connected to the vehicle structure 116.

Since the second power storage module 20 is thermally connected to the vehicle structure 116, heat generated at the power storage portion 22 can be transferred to the vehicle structure 116. Then, a temperature increase of the power storage portion 22 can be suppressed. As the result, decreases of the life and the charging and discharging performance in the power storage portion 22 by charging and discharging in a high temperature state can be suppressed, and then charging and discharging performance can be stabilized.

The in-vehicle battery system 1 has a terminal connecting member 32 which electrically connects the external terminal 28 of the second power storage module 20 and the vehicle structure 116. For example, the terminal connecting member 32 is a bus bar, and connects the external terminal 28 to the chassis of the vehicle structure 116. The external terminal 28 connected to the terminal connecting member 32, for example, is the negative terminal 28a. Therefore, the second power storage module 20 of the embodiment is thermally connected to the vehicle structure 116 also through the terminal connecting member 32.

In the case that the external terminal 28 is connected to the vehicle structure 116, the external terminal 28 can be connected to the ground (earth), and additionally heat generated at the power storage portion 22 can be transferred to the vehicle structure 116 through the terminal connecting member 32. Then, a temperature increase of the power storage portion 22 can be suppressed. As the result, decreases of the life and the charging and discharging performance in the power storage portion 22 by charging and discharging in a high temperature state can be suppressed, and then charging and discharging performance can be stabilized.

Here, only either of the thermal connection by the direct contact between the second power storage module 20 and the vehicle structure 116, and the thermal connection through the terminal connecting member 32 between the second power storage module 20 and the vehicle structure 116, may be possible.

The present invention is not limited to the above embodiments, and can be modified through design changes based on the knowledge of the person of the ordinary skill in the art, and such modified embodiments are covered by the scope of the present invention. Further, the combination of the elements in the above embodiments is also cover by the scope of the present invention.

Further, in the above embodiment, the power storage portion 22 has the storage batteries 23, but is not limited to this. For example, the power storage portion 22 can be a capacitor of an electric double layer capacitor or the like.

Additionally, as another setting structure of the in-vehicle battery system 1, the second power storage module 20 may be disposed in the vicinity of the steering wheel in the engine room 102 of the vehicle 100. In the area in the vicinity of the steering wheel in the engine room 102, there are a lot of spaces, the air easily flows. Therefore, by disposing the second power storage module 20 in the vicinity of the steering wheel, the power storage portion 22 can be efficiently cooled.

The invention claimed is:

1. An in-vehicle battery system comprising:
a first power storage module including a lead-acid battery; and
a second power storage module including a power storage portion having a higher energy density than that of the lead-acid battery,
wherein the lead-acid battery and the power storage portion are electrically connected in parallel to a power generating portion which converts a regenerative energy to electric power, and
the first power storage module and the second power storage module are provided in an engine room of a vehicle, and
the second power storage module is disposed at a greater distance from an engine in the engine room than the first power storage module, and
the first power storage module is disposed between the engine and the second power module, and the first power storage module and the second power storage module are set side-by-side in the engine room.

2. The in-vehicle battery system according to claim 1 comprising:
wherein the second power storage module is disposed closer to a passenger compartment than the first power storage module.

3. The vehicle battery system according to claim 1,
wherein the lead-acid battery and the power storage portion are electrically connected in parallel to a power generating portion which converts a regenerative energy to electric power, and
the second power storage module is thermally connected to a vehicle structure.

4. The in-vehicle battery system according to claim 3,
further comprising a terminal connecting member which connects an external terminal of the second power storage module to the vehicle structure,
wherein the second power storage module is thermally connected to the vehicle structure through the terminal connecting member.

5. The in-vehicle battery system according to claim 1,
wherein the first power storage module has a larger heat capacity than that of the second power storage module.

6. The in-vehicle battery system according to claim 1,
wherein surfaces of the first power storage module and the second power storage module partially contact each other.

7. The in-vehicle battery system according to claim 1,
wherein in the view from the engine, the first storage module substantially hides the second power storage module from the engine.

* * * * *